(12) United States Patent
Stommel et al.

(10) Patent No.: US 8,191,415 B2
(45) Date of Patent: Jun. 5, 2012

(54) TEST BED FOR ELEVATION SIMULATION

(75) Inventors: Peter Stommel, Eschweiler (DE); Jan Widdershoven, BG Ransdaal (NL)

(73) Assignee: FEV Motorentechnik GmbH, Aachen (DE)

( * ) Notice: Subject to any disclaimer, the term of this patent is extended or adjusted under 35 U.S.C. 154(b) by 148 days.

(21) Appl. No.: 12/756,545

(22) Filed: Apr. 8, 2010

(65) Prior Publication Data
US 2010/0257924 A1    Oct. 14, 2010

(30) Foreign Application Priority Data

Apr. 9, 2009 (DE) .................. 10 2009 016 807

(51) Int. Cl.
*G01M 15/04* (2006.01)
(52) U.S. Cl. .................. 73/118.02; 73/116.02
(58) Field of Classification Search ............... 73/116.01, 73/116.02, 116.05, 118.01, 118.02
See application file for complete search history.

(56) References Cited

U.S. PATENT DOCUMENTS

| | | | | |
|---|---|---|---|---|
| 4,964,298 A | * | 10/1990 | Matsushita | ............ 73/116.01 |
| 6,023,890 A | * | 2/2000 | Zenobi | ............. 52/64 |
| 7,127,958 B2 | * | 10/2006 | Blewett et al. | ............ 73/865.6 |
| 7,849,734 B2 | * | 12/2010 | Moritani et al. | ........... 73/116.05 |
| 7,954,366 B2 | * | 6/2011 | Gushman et al. | ........... 73/116.01 |
| 2005/0235763 A1 | * | 10/2005 | Blewett et al. | ............ 73/866 |
| 2010/0107749 A1 | * | 5/2010 | Gushman et al. | ........... 73/116.02 |

FOREIGN PATENT DOCUMENTS

| | | |
|---|---|---|
| AT | 1 58 949 | 10/1997 |
| CH | 2 02 891 | 2/1939 |
| CH | 2 31 514 | 3/1944 |
| DE | 6 21 086 | 11/1935 |
| DE | 101 55 245 | 5/2003 |

OTHER PUBLICATIONS

German Search Report dated Dec. 3, 2009.

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

The invention relates to a test bed (1) for elevation simulation for a test specimen (11), in particular, for an internal combustion engine (11) with a supply chamber (20) in which a supply system (21) is arranged, a testing chamber (10) structurally separate from the supply chamber (20) for holding the test specimen (11), wherein the testing chamber (10) is in fluid connection with the supply chamber (20) and thus conditioning of the settings for the test specimen (11) to be tested can be achieved.

21 Claims, 2 Drawing Sheets

TEST BED FOR ELEVATION SIMULATION

CROSS-REFERENCE TO RELATED APPLICATION

The present application claims the benefit of priority under 35 U.S.C. §119(a) to German Patent Application No. DE 10 2009 016 807.9 filed Apr. 9, 2009.

FIELD OF THE INVENTION

The invention relates to a test bed for elevation simulation for a test specimen, in particular, for an internal combustion engine with a supply chamber in which a supply system is arranged, a testing chamber structurally separated from the supply chamber for holding the test specimen, wherein the testing chamber is in fluid connection with the supply chamber and thus conditioning of the settings for the test specimen to be tested can be achieved.

BACKGROUND OF THE INVENTION

It is generally known to study test specimens, in particular, internal combustion engines or motors, in test beds under standard conditions, in particular, under a standard atmospheric pressure of 1013 mbar. According to the geodetic elevation of the test bed, considerable problems can arise. A geodetic elevation may indeed be simulated partially with intake-air conditioning and exhaust-gas counter pressure regulation. This is known, for example, from DE 40 15 818 C2, DE 318161, DE 317052, as well as DE 711747, each of which is incorporated herein by reference. In the case of these known test beds, the original suction side and also the exhaust-gas side of the internal combustion engine is indeed influenced. It is problematic, however, that under some circumstances, not all of the components, such as seals, sensors, etc. of the motor are exposed to the testing conditions, which compromises the comparability of the test results.

The task of the invention is to avoid the disadvantages named above, in particular, to disclose a test and also a method for elevation simulation in which the desired ambient conditions for the test specimen can be provided with high precision in a simple way.

SUMMARY OF THE INVENTION

According to the invention, it is provided that the supply system has a first supply unit and a second supply unit. The first supply unit provided for conditioning at least the temperature conditions is located in the supply chamber. The second supply unit provided for conditioning the pressure settings is separate from the first supply unit and has a fan element that provides a desired pressure such that the pressure is essentially equal in the supply chamber and in the testing chamber. The first supply unit is responsible for at least the temperature regulation, which is realized, for example, as a surrounding air ventilation system, and is located within the supply chamber. In addition, the first supply unit can optionally execute, in addition to temperature regulation, also air-humidity regulation. The additional test-bed component for elevation simulation is the second supply unit that is structurally separate from the first supply unit and executes the pressure regulation corresponding to the desired standard conditions. Based on the separation of the supply system into the first and second supply units, the first supply unit can have a structurally simple construction that is based, among other things, on the fact that the same pressure is set both in the supply chamber and also in the testing chamber. The test bed concept of this invention thus provides to keep the supply chamber and testing chamber under the same pressure, so that standard components can be used for the supply system, which simultaneously leads to considerable cost reductions for the entire system. Simultaneously, a simple configuration of the test bed can be achieved.

Advantageously, the supply chamber and the testing chamber have a pressure-communicating construction, in particular, because the supply chamber and the testing chamber each have a wall that contacts and are constructed with at least one opening through which a fluid can flow between both chambers. Here, the supply chamber and/or the testing chamber can be constructed as transportable containers. The wall of the supply chamber and/or the testing chamber can have a steel, concrete, or brickwork construction. Preferably, two openings are provided through which can flow the fluid with the desired environmental conditions. The fluid flows through a first opening from the supply chamber into the testing chamber. A second opening facing away from the first opening is used such that the fluid can flow from the testing chamber back into the supply chamber. The first supply unit that may be constructed as a recirculating ventilation unit ensures that a corresponding flow of the fluid is achieved while maintaining the desired environmental conditions.

Advantageously, the supply chamber and/or the testing chamber have devices that cause a targeted guidance of the flowing fluid (i.e., surrounding air) within the supply chamber and the testing chamber. The devices can be, for example, guide elements, in particular, guide plates, wherein a large portion of conditioned fluid can be fed selectively into the testing chamber. In this way, the distribution of the conditioned fluid between the testing chamber and the supply chamber can be simultaneously regulated. This regulation can also be achieved, for example, with air flaps provided within the test bed. For example, allowing complete guidance of the conditioned fluid to take place only in the testing chamber, wherein the testing chamber can be set quickly with respect to temperature and humidity, if a portion of the fluid flow also passes through the supply chamber. For full load or quick load changes, if a large dissipation of heat and/or quick changes to the conditions is required, this switching is also useful. The devices thus could be switched such that the fluid can flow both in the testing chamber and also in the supply chamber or the fluid can flow only in the testing chamber or the fluid can flow only in the supply chamber.

Another embodiment of the invention provides that a ventilation module is provided that has an inlet area for drawing in generated exhaust gases of the test specimen, wherein the inlet area is located in the base area, in particular, underneath the base area of the testing chamber. Any generated heavy exhaust gases or vapors tend to settle at the base area of the testing chamber. In order to perform a satisfactory suction for the testing, the inlet area of the ventilation module is located as much as possible on the base area of the testing chamber. Thus, a satisfactory discharge of these gases from the test bed can be achieved, wherein a risk of explosion can be simultaneously avoided.

In another embodiment of the invention, an additional chamber is arranged underneath the testing chamber, wherein the base area that has openings for fluid passage separates the additional chamber from the testing chamber. The base area is thus located between the additional chamber and the testing chamber. In this embodiment, the inlet area of the ventilation module extends into the additional chamber into which the exhaust gases of the test specimen can reach. Advantageously, the base area is constructed as a screen-like metal construction.

Another measure improving the invention can provide that an additional exhaust-gas extraction system is arranged in the testing chamber, wherein this system leads generated exhaust gases of the test specimen from the testing chamber. Here, the exhaust-gas extraction system has an inlet area that is located, in particular, above the test specimen. Exhaust gases that rise upward can reliably reach the inlet area of the exhaust-gas extraction system and thus can be transported out from the testing chamber.

Advantageously, the fan element draws in surrounding air located outside of the test bed, with the surrounding air then flowing into the supply chamber. In the supply chamber, the corresponding conditioning of the desired settings for the test specimen in the testing chamber is performed. If the pressure to be set in the testing chamber is a high pressure, it can be advantageous to provide a throttle element in the ventilation module and also in the exhaust-gas extraction system. If the pressure to be set in the testing chamber is a low pressure, it can be advantageous to integrate the second supply unit in the ventilation module and/or in the exhaust-gas extraction system. Here, in particular, the fan element can be arranged in the exhaust-gas extraction system, in order to pump out the fluid, including exhaust gases, located within the testing chamber. This likewise produces a circulation of fluid from the supply chamber into the testing chamber and back again into the supply chamber, with a certain mass flow of fluid being simultaneously drawn out from the testing chamber. Simultaneously, an input flow into the test bed is realized via a separate line of the second supply unit. Here, a throttle element may be provided through which surrounding air flows into the supply chamber and/or into the testing chamber due to the set low pressure in the supply chamber and testing chamber.

Due to the high forces acting on the inner walls of the supply chamber and/or the testing chamber, it can be useful that the supply chamber and the testing chamber are connected to each other with a material and/or positive and/or non-positive fit, in particular, screw connections and/or catch connections are provided for attaching the connection chamber to the testing chamber.

The task is also achieved by a method with the features described in the claims. Here, the supply system has a first supply unit and a second supply unit, with conditioning of the temperature settings being performed by means of the first supply unit located in the supply chamber and conditioning of the pressure settings being performed by means of the second supply unit that is structurally separate from the first supply unit, such that the same pressure is set in the supply chamber and in the testing chamber. Here, the second supply unit can have a fan element, wherein both a low pressure and also a high pressure can be set within the test bed, in particular, within the supply chamber and the testing chamber.

A control and/or regulation unit may be provided that ensures conditioning of the settings for the test specimen, with this unit defining, in particular, the operation of the first and the second supply units. Likewise a ventilation module and/or an exhaust-gas extraction system may be provided that are controlled with the control and/or regulation unit. According to the invention, fluid circulates between the supply chamber and the testing chamber, wherein exhaust-gas counter pressure regulation is performed in the testing chamber.

BRIEF DESCRIPTION OF THE DRAWINGS

Additional advantages, features, and details of the invention emerge from the following description in which, with reference to the figures, several embodiments of the invention are described in detail. Here, the features mentioned in the claims and in the description can be essential for the invention individually by themselves or in arbitrary combination. Shown are:

DETAILED DESCRIPTION OF THE INVENTION

Figure 1:
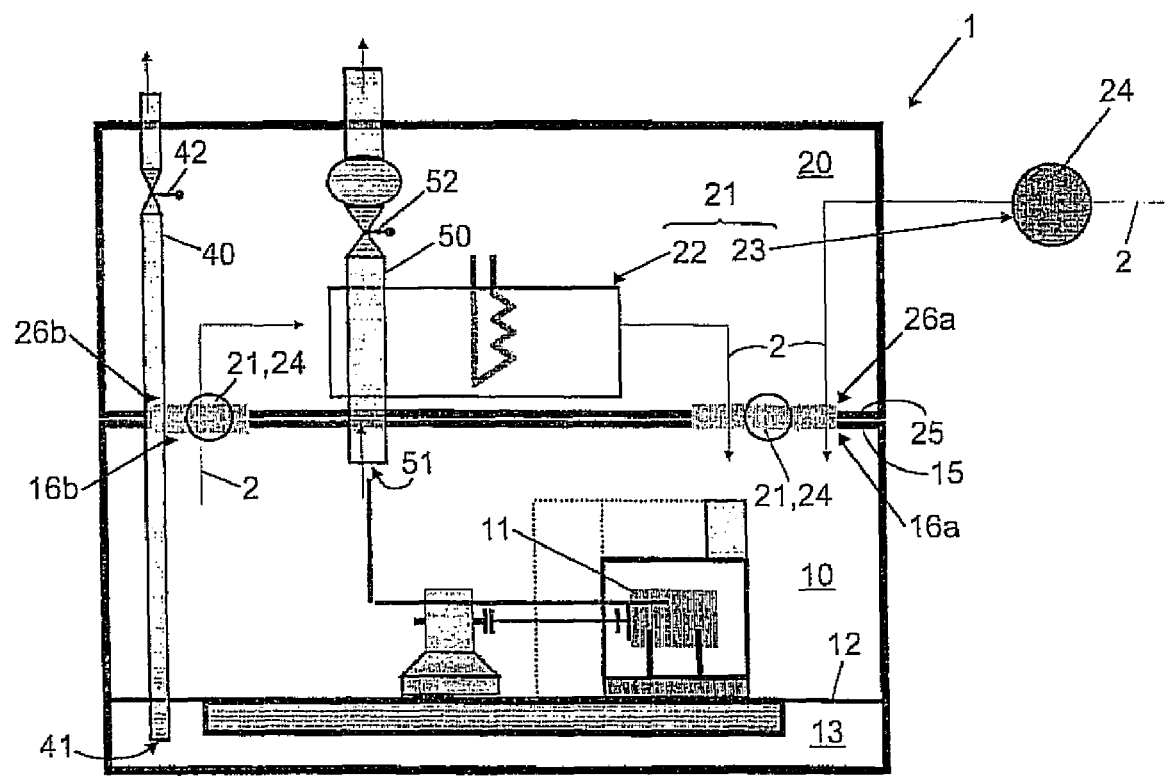
FIG. 1 a test bed according to the invention for elevation simulation with a supply chamber and a testing chamber, wherein a high pressure is simulated, and FIG. 2 another embodiment of a test bed for elevation simulation with a supply chamber and a testing chamber, wherein a low pressure is simulated.
Figure 2:
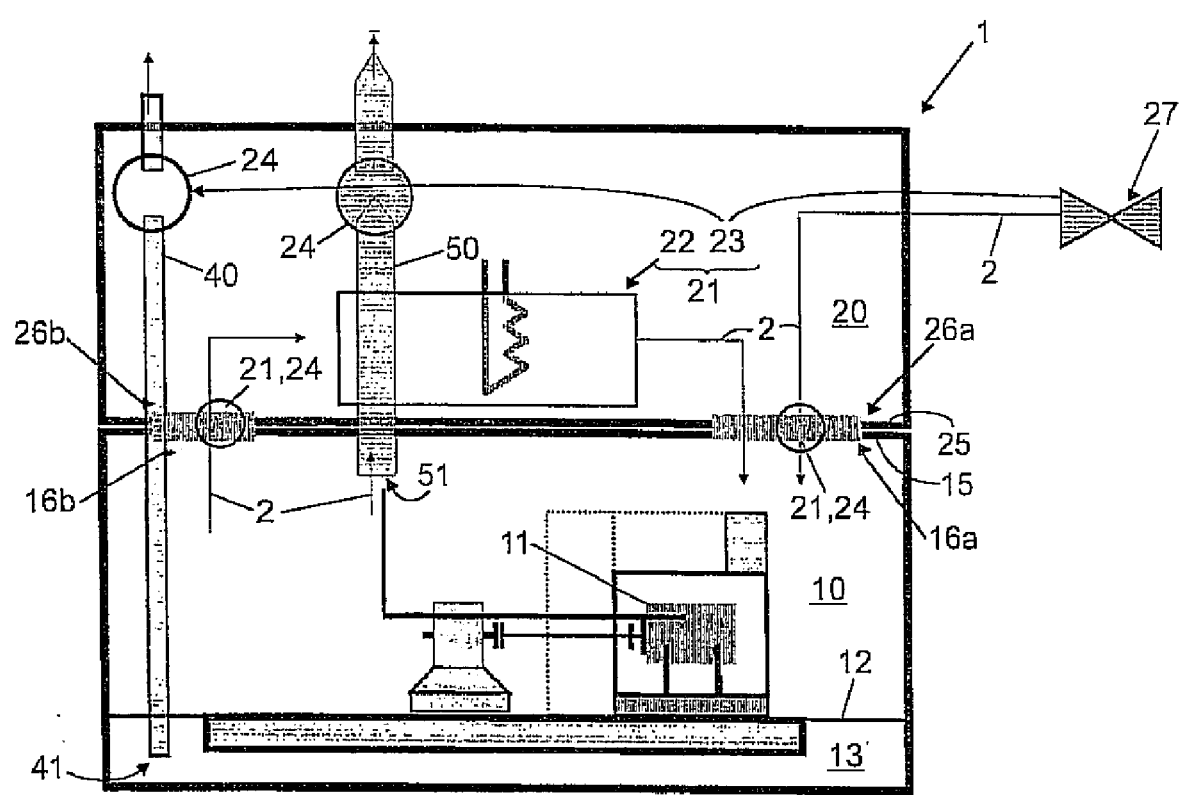

FIG. 1 and FIG. 2 each show a test bed 1 for elevation simulation for a test specimen 11, which is, in the present embodiment, an internal combustion engine 11, in particular, a motor-vehicle engine. At the left, next to the internal combustion engine 11 there is the associated braking system that is not provided explicitly with a reference symbol. The internal combustion engine 11 is located in a testing chamber 10 of the test bed 1. Above the testing chamber 10 there is a supply chamber 20 in which a supply system 21 is arranged. The supply chamber 20 is spatially separate from the testing chamber 10. As can be clearly identified in FIGS. 1 and 2, the testing chamber 10 is in fluid connection with the supply chamber 20. The wall 15 of the testing chamber 10 and also the wall 25 of the supply chamber 20 facing the wall 15 are each constructed with an opening 16a, 16b, 26a, 26b. A fluid 2 can flow through these openings 16a, 16b, 26a, 26b between both chambers 10, 20. Thus, the supply chamber 20 and the testing chamber 10 have a pressure-communicating construction.

The supply system 21 has a first supply unit 22 and also a second supply unit 23. The first supply unit 22 is used in the present embodiment both for conditioning the temperature settings and also for conditioning the air-humidity settings within the test bed 1 or within the supply chamber 20 and the testing chamber 10. The first supply unit 22 is a recirculating ventilation unit that provides for the temperature regulation and air-humidity regulation within the test bed 1. The second supply unit 23 is provided separately and structurally detached from the first supply unit 22 and this second supply unit 23 has, according to FIG. 1, a fan element 24 that first pumps surrounding air from outside of the test bed 1 into the supply chamber 20. In this way, a corresponding conditioning of the desired pressure settings is performed for the test specimen 11 within the testing chamber 10. During the operation of the test bed 1, the supply system 21 provides that the pressure is essentially equal in the supply chamber 20 and in the testing chamber 10. Here, the fluid 2 flows from the supply chamber 20 through the first opening 16a, 26a into the testing chamber 10. Thus, the internal combustion engine 11 is exposed to the desired ambient conditions. The fluid 2 leaves the supply chamber 10 through the second opening 16b, 26b and enters again into the supply chamber 20. Thus, a circulating flow is achieved in the test bed 1, in particular, within the testing chamber 10 and the supply chamber 20.

Due to the exhaust gases generated during the operation of the test specimen 11, in particular, the internal combustion engine 11, according to the present embodiments, a ventilation module 40 and also an additional exhaust-gas extraction system 50 are provided. During the operation of the test bed 1 and also the test specimen 11 or the internal combustion engine 11, exhaust gases are emitted from the internal combustion engine 11 and come into the testing chamber 10. Heavy exhaust gases and vapors sink to the base area 12 of the testing chamber 10 and reach into the additional chamber 13 lying underneath the testing chamber 10. The base area 12 is constructed with a plurality of openings for the fluid passage of the heavy exhaust gases. Here the base area 12 spatially separates the testing chamber 10 from the additional chamber 13. In the present embodiment according to FIGS. 1 and 2, the base area 12 has a screen-like metal construction. The ventilation module 40 has an inlet area 41 that projects into the additional chamber 13.

The exhaust-gas extraction system 50 is likewise constructed with an inlet area 51 located within the testing chamber 10 above the internal combustion engine 11. The exhaust-gas system of the engine 11 ends directly under the inlet area 51 of the exhaust-gas extraction system 50, so that a large portion of exhaust gases of the engine 11 can be discharged directly. Via each of the inlet areas 41, 51, the exhaust gases generated in FIGS. 1 and 2 can be satisfactorily led out from the test bed 1 through the ventilation module 40 and also through the exhaust-gas extraction system 50.

According to FIG. 1, a high pressure in the supply chamber 20 and also in the testing chamber 10 is simulated by means of the supply system 21. Here, the fan 24 of the second supply unit 23 pumps surrounding air 2 into the test bed 1. Within the ventilation module 40 there is a throttle element 42. The heavy exhaust gases come out from the additional chamber 13 through the inlet area 41 of the ventilation module 40 and flow through the throttle element 42 outward and can thus be drawn out and discharged from the test bed 1. Due to the high pressure within the test bed 1, according to FIG. 1, a corresponding removal of the exhaust gases located within the testing chamber 10 also takes place through the exhaust-gas extraction system 50, wherein the exhaust gases are led through the inlet area 51 of the exhaust-gas extraction system 50 and flow outward through a throttle element 52 arranged within the exhaust-gas extraction system 50.

According to FIG. 2, a certain low pressure is created by the supply system 21 within the test bed 1, in particular, in the supply chamber 20 and also in the testing chamber 10. Here the second supply unit 23 is constructed with a fan element 24 that is integrated into the exhaust-gas extraction system 50. As in FIG. 1, fluid 2 also flows through the first opening 16a, 26b out from the supply chamber 20 into the testing chamber 10. Here, the fan element 24 draws fluid 2 out from the test bed 1 from the testing chamber 10. The second supply unit 23 is also constructed with a throttle element 27 through which surrounding air 2 flows into the supply chamber 20 due to the corresponding pressure drop. The first supply unit 22 located within the supply chamber 20 provides for the temperature regulation and air-humidity regulation as already described in the embodiment according to FIG. 1.

In addition, the second supply unit 23 has a fan element 24 within the ventilation module 40. The fan element 24 of the ventilation module 40 here draws the heavy exhaust gases located in the additional chamber 13 out from the test bed 1.

Further, the supply system 21 is optionally constructed with a fan element 24 that is integrated in the opening 16a, 26a and also in the opening 16b, 26b, by means of which the "driving" of the conditioned fluid flow 2 can be improved. It is possible—according to special requirements—to provide devices that are not shown explicitly and with which a targeted fluid flow could be achieved within the test bed 1. The devices could be, for example, air flaps that are arranged in the supply chamber 20 or in the testing chamber 10 and that are switchable so that the conditioned fluid 2 flows, for example, in both chambers 10, 20 or only in the testing chamber 10.

It is especially advantageous in the two embodiments that the supply system 21 is designed such that conditioning of the pressure settings is performed so that the same pressure is set in the supply chamber 20 and also in the testing chamber 10. In this way, structurally complicated supply systems are not needed. A control and regulation unit not shown explicitly is provided in both embodiments, with this unit providing corresponding conditioning of the settings for the internal combustion engine 11, in particular, performing corresponding control and regulation of the first supply unit 22, the second supply unit 23, the ventilation module 40, and also the exhaust-gas extraction system 50. Here, both the supply chamber 10 and also the testing chamber 20 can be constructed as transportable containers. Due to the high loads within the supply chamber 20 and also the testing chamber 10, their walls have a correspondingly reinforced construction. The walls of the supply chamber 20 and also the testing chamber 10 may alternatively have a concrete, brickwork, or a corresponding steel construction. The fan element 24 may also be integrated alternatively into the wall of the supply chamber 20 or the testing chamber 10. An arrangement of the fan element 24 with suitable air guidance within one of the mentioned chambers 10, 20 is also possible. The features of the embodiments from FIGS. 1 and 2 may obviously be integrated within a single test bed.

Having thus described the invention, various other embodiments for a test bed for elevation simulation may be apparent to those of skill in the art that do not depart from the spirit of the present embodiments.

It is claimed:

1. A test bed for elevation simulation of a test specimen comprising:
    a supply chamber having a supply system for conditioning the test specimen to ambient conditions; and
    a testing chamber structurally separate from the supply chamber for holding the test specimen, wherein the testing chamber is in fluid connection with the supply chamber and thus conditioning of the settings for the test specimen to be tested can be achieved;
    the supply system having a first supply unit and a second supply unit;
    wherein the first supply unit provided for conditioning at least a temperature settings is located in the supply chamber; and wherein
    the second supply unit provided for conditioning the pressure settings is separate from the first supply unit and has a fan element that provides a desired pressure such that the pressure is essentially equal in the supply chamber and in the testing chamber.

2. The test bed according to claim 1, wherein the first supply unit is constructed for temperature regulation and for air-humidity regulation.

3. The test bed according to claim 1, wherein the supply chamber and the testing chamber are in pressure communication, wherein a supply chamber wall and a testing chamber wall are in contact and wherein each of the supply chamber wall and the test chamber wall includes at least one corresponding opening through which a fluid can flow between the test chamber and the supply chamber.

4. The test bed according to claim 3, wherein the supply chamber and/or the testing chamber has devices that generate a targeted guidance of the flowing fluid within the supply chamber and the testing chamber.

5. The test bed according to claim 4, wherein the devices are switchable such that
    a) the fluid can flow both in the testing chamber and also in the supply chamber,
    b) the fluid can flow only in the testing chamber, or
    c) the fluid can flow only in the supply chamber.

6. The test bed according to claim 3, wherein at least one of the supply chamber wall or the testing chamber wall is formed of steel, concrete, or brickwork.

7. The test bed according to claim 1, wherein a ventilation module is provided that has an inlet area for the extraction of exhaust gases, wherein the inlet area is located underneath a base area of the testing chamber.

8. The test bed according to claim 7, wherein an additional chamber is arranged underneath the testing chamber, wherein the base area separates the additional chamber from the testing chamber and the base area includes openings for the passage of fluid between the testing chamber and the additional chamber.

9. The test bed according to claim 7, wherein the base area is constructed as a screen-like metal construction.

10. The test bed according to claim 7, wherein an exhaust-gas extraction system is arranged in the testing chamber, the exhaust-gas extraction system extracts the exhaust gases generated by the test specimen out from the testing chamber.

11. The test bed according to claim 10, wherein the exhaust-gas extraction system is constructed with an inlet area that is located above the test specimen.

12. The test bed according to claim 10, wherein the fan element is integrated into the exhaust-gas extraction system or into the ventilation module.

13. The test bed according to claim 1, wherein at least one of the supply chamber or the testing chamber is constructed as a transpotable container.

14. The test bed according to claim 1, wherein the fan element draws in surrounding air located outside of the test bed into the supply chamber.

15. The test bed according to claim 1, wherein the fan element is a rotary piston fan.

16. The test bed according to claim 1, wherein the supply chamber and the testing chamber are connected by one of a positive fit or a non-positive fit.

17. A method for elevation simulation within a test bed for a test specimen, the method comprising the steps of:
providing a supply chamber in which a supply system is arranged, providing a testing chamber structurally separate from the supply chamber for holding the test specimen, wherein the testing chamber is in fluid connection with the supply chamber; conditioning of the settings for the test specimen to be tested can be achieved, wherein
providing a first supply unit and a second supply unit in the supply system, wherein conditioning of the temperature settings is performed by means of the first supply unit located in the supply chamber and
conditioning of the pressure settings is performed by means of the second supply unit that is structurally separated from the first supply unit such that the same pressure is set in the supply chamber and in the testing chamber.

18. The method according to claim 17, wherein the second supply unit has a fan element, wherein both a low pressure and a high pressure can be set within the test bed.

19. The method according to claim 17, wherein a control unit and/or regulation unit is provided that provides for conditioning of the settings for the test specimen and that defines, in particular, the operation of the first and the second supply unit.

20. The method according to claim 19, wherein a ventilation module and/or an exhaust gas extraction system is provided that are controlled with the control and/or regulation unit.

21. The method according to claim 17, wherein fluid circulates between the supply chamber and the testing chamber, wherein exhaust-gas counter pressure regulation is performed in the testing chamber.

* * * * *